US006978928B2

(12) United States Patent
Shibata et al.

(10) Patent No.: US 6,978,928 B2
(45) Date of Patent: Dec. 27, 2005

(54) MEDIUM HANDLING MACHINE

(75) Inventors: Yasushi Shibata, Seto (JP); Yoshio Horiba, Seto (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 10/617,883

(22) Filed: Jul. 14, 2003

(65) Prior Publication Data

US 2004/0060980 A1 Apr. 1, 2004

(30) Foreign Application Priority Data

Sep. 27, 2002 (JP) ............................ 2002-282170

(51) Int. Cl.[7] ............................................ G06F 17/60
(52) U.S. Cl. ...................................... 235/381; 235/379
(58) Field of Search ................................ 235/381, 379, 235/382, 383, 486, 476–478; 705/17, 39; 186/35–37

(56) References Cited

U.S. PATENT DOCUMENTS 4,380,201 A * 4/1983 Dion .......................... 109/17
4,540,106 A * 9/1985 Fukatsu ...................... 221/13
6,478,221 B1 * 11/2002 Sommerville ............... 235/379
6,726,101 B1 * 4/2004 McIntyre et al. ........... 235/382
2004/0164141 A1 * 8/2004 Egami et al. .............. 235/379

FOREIGN PATENT DOCUMENTS

| | | | | |
|---|---|---|---|---|
| JP | 58192170 A | * 11/1983 | | G06F 15/30 |
| JP | 07331974 A | * 12/1995 | | G07D 9/00 |
| JP | 08119565 A | * 5/1996 | | B66B 13/28 |
| JP | 09-270050 | 10/1997 | | |
| JP | 10069557 A | * 3/1998 | | G07D 1/00 |
| JP | 10188079 A | * 7/1998 | | G07D 9/00 |

* cited by examiner

*Primary Examiner*—Diane I. Lee
(74) *Attorney, Agent, or Firm*—McDermott Will & Emery LLP

(57) ABSTRACT

A medium handling device that prompts a user to pull out his hand from a media insertion/delivering port without closing a shutter of the port when the hand of the user remains inside the port, even if a predetermined time has elapsed. A timer counts a time during which the shutter is opened. When the count of the timer has reached a predetermined value, it is checked whether the hand remains inside the media insertion/delivering port. When the hand remains, the shutter is slid to and fro over a predetermined distance, thereby making advance notice of closing of the shutter.

14 Claims, 6 Drawing Sheets

SHUTTER FOR MONEY INSERTION/DELIVERING PORT OPENED

CLOSING OF SHUTTER NOTICED IN ADVANCE UPON DETECTION OF HAND REMAINING INSIDE MONEY INSERTION/DELIVERING PORT

SHUTTER CLOSED AFTER PULLING OUT HAND FROM MONEY INSERTION/DELIVERING PORT

SHUTTER FOR MONEY INSERTION/DELIVERING PORT OPENED

CLOSING OF SHUTTER STARTED

SHUTTER CLOSED

SHUTTER FOR MONEY INSERTION/DELIVERING PORT OPENED

HAND BEING INSERTED INTO MONEY INSERTION/DELIVERING PORT

SHUTTER CLOSED AFTER PULLING OUT HAND FROM MONEY INSERTION/DELIVERING PORT

DISPLAY PANEL

MEDIUM HANDLING MACHINE

BACKGROUND OF THE INVENTION

The present invention relates to a medium handling machine for receiving a medium from and delivering a medium to a user of a machine such as an automated teller machine that handles bills or paper currency. More specifically, the invention relates to opening and closing of a shutter provided to cover a media insertion/delivering port mounted in the medium handling machine.

In conventional automated cash transaction machines such as transfer machines installed in financial service institutions, an opening time of the shutter of a money insertion/delivering port is fixed, thereby sometimes requiring all the more time to perform transaction processing. In order to solve this problem, there is known a technique disclosed in JP-A9-270050, for example. In this technique, in order to provide a cash transaction device in which the opening time of an opening/closing part of the money insertion/delivering port provided therein can be controlled according to customer needs, operation means for commanding extension of the opening time is provided for the cash transaction machine. When the operation means is activated, the opening time of the opening/closing part is extended by a certain time.

SUMMARY OF THE INVENTION

The prior art described above, however, provides the technique merely for extending the opening time of the opening part of the money insertion/delivering port. In order to extend the opening time, a user operation is required. Further, even if the opening time was extended by the user operation, the shutter is still closed after a predetermined time. For this reason, if the predetermined time has elapsed while the user is inserting his hand inside the money insertion/delivering port, the shutter is automatically closed. The user's hand would thereby get caught in the shutter.

In order to solve the problems described above, it is therefore an object of the present invention to provide a medium handling machine that does not cause a shutter therein to be closed when a hand of a user is inside a media insertion/delivering port, even if a predetermined time has elapsed, and then prompts the user to pull out his hand from the media insertion/delivering port.

In order to achieve the object described above, the present invention includes:

a media insertion/delivering port for receiving and delivering a medium;

a shutter for opening/closing the media insertion/delivering port;

a sensor provided in the media insertion/delivering port;

a timer for counting a time during which the shutter is opened;

shutter closing advance notice means provided in the media insertion/delivering port; and a control unit for causing the shutter closing advance notice means to be activated when a count of the timer has reached a predetermined value and the sensor senses an object.

Other objects, features and advantages of the invention will become apparent from the following description of the embodiments of the invention taken in conjunction with the accompanying drawings.

DESCRIPTION OF THE EMBODIMENTS

The present invention can be applied to a medium handling device in general which includes a media insertion/delivering port into which a hand is put and from which a hand is pulled out for inserting and receiving a medium and a shutter for opening and closing the media insertion/delivering port. Herein, an automated cash transaction device shown in FIGS. 1 and 2, managed by financial service institutions, for receiving bills or bank notes from and delivering bills to a user will be taken by way of an example for describing embodiments of the present invention. In this automated cash transaction device, a bill is used as the medium. A first embodiment of the present invention will be described below with reference to FIGS. 3 to 5, a second embodiment of the present invention will be described below with reference to FIGS. 6 to 8, and a third embodiment of the present invention will be described below with reference to FIGS. 9 to 12.

Figure 1:
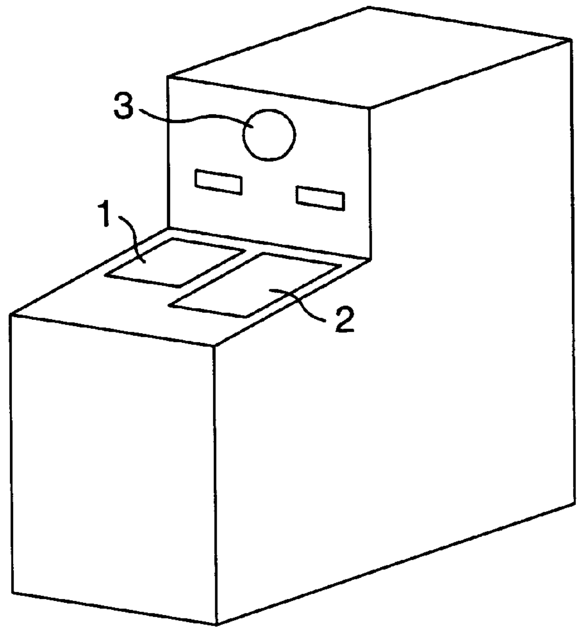
FIG. 1 is a perspective view showing an external appearance of an automated cash transaction device.

FIG. 1 is a perspective view schematically showing the automated cash transaction device according to an embodiment of the present invention. The automated cash transaction device in FIG. 1 includes a money insertion/delivering port 1 for receiving bills from a user and delivering bills from the automated cash transaction device, a display panel 2 for displaying guidance to the user, and a loudspeaker 3 for supplying audio guidance or an alarm to the user. The money insertion/delivering port 1, display panel 2, and loudspeaker 3 may also be referred to as a media insertion/delivering port unit, a display unit, and an audio output unit, respectively.

Figure 2:
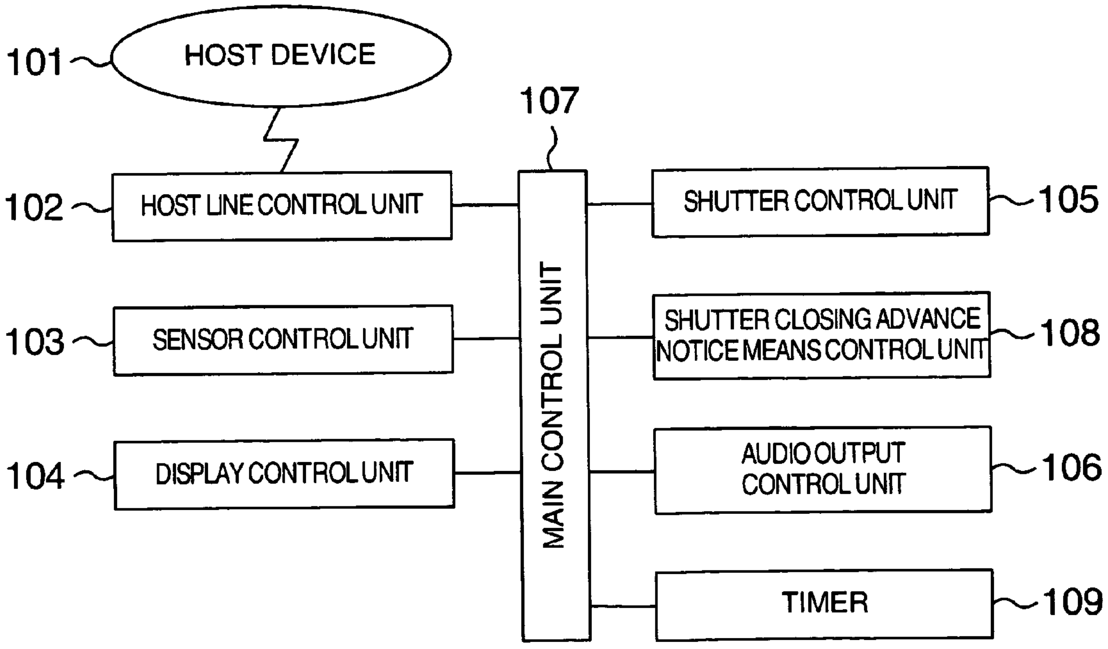
FIG. 2 is a control block diagram of the automated cash transaction device.

FIG. 2 is a control block diagram for controlling the money insertion/delivering port 1, display panel 2, and loudspeaker 3. As shown in FIG. 2, a host line control unit 102, a sensor control unit 103, a display control unit 104, a shutter control unit 105, an audio output control unit 106, a main control unit 107, a shutter closing advance notice control unit 108, and a timer 109 are included. The host line control unit 102 executes control over reception of a commanding signal from a host device 101 to the main control unit 107 and over a message transmission of a result of processing from the main control unit 107 to the host device 101. The sensor control unit 103 monitors statuses of sensors 5 to 7 mounted inside the money insertion/delivering port 1, for notification to the main control unit 107. The display control unit 104 displays characters or the like of which output has been commanded from the host device 101, on the display panel 2. The shutter control unit 105 controls opening and closing of a shutter 4 shown in FIG. 3 onwards of the money insertion/delivering port 1 in FIG. 1, according to a command from the main control unit 107. The audio output control unit 106 supplies an audio output commanded from the host device 101 to the loudspeaker 3. The shutter closing advance notice means control unit 108 executes control over a sliding operation of the shutter 4 over a predetermined distance shown in FIG. 4, a lamp 11 shown in FIGS. 6, 7 and 8, and a stopper 10 shown in FIGS. 9, 10 and 11. The timer 109 measures an opening time of the shutter 4. Here, the opening time of the shutter 4 may be a time elapsed after the shutter 4 has been opened. Alternatively, it may also be the time elapsed after the shutter 4 has started to be opened, or the time elapsed after the main control unit 107 has commanded the shutter control unit 105 to open the shutter 4.

Figure 4:
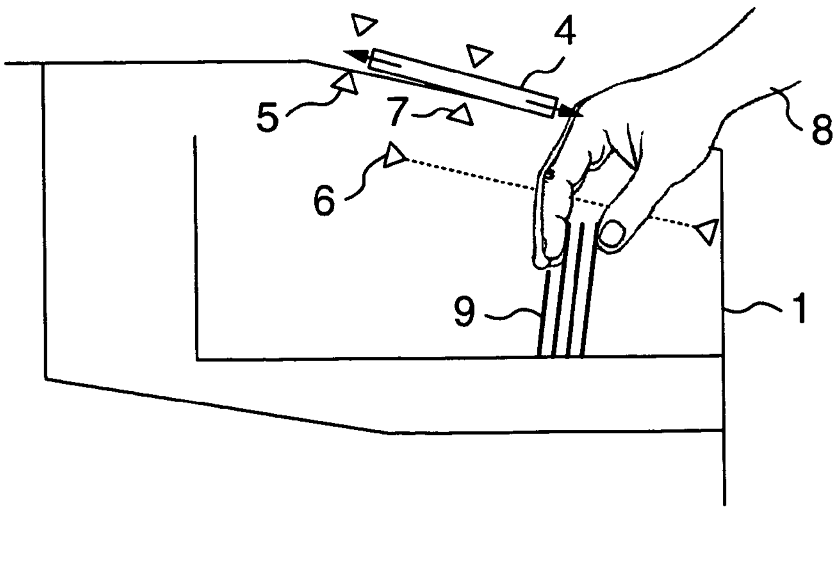
FIG. 4 is a diagram showing a state where closing of the shutter is noticed in advance according to the first embodiment of the present invention.
Figure 5:
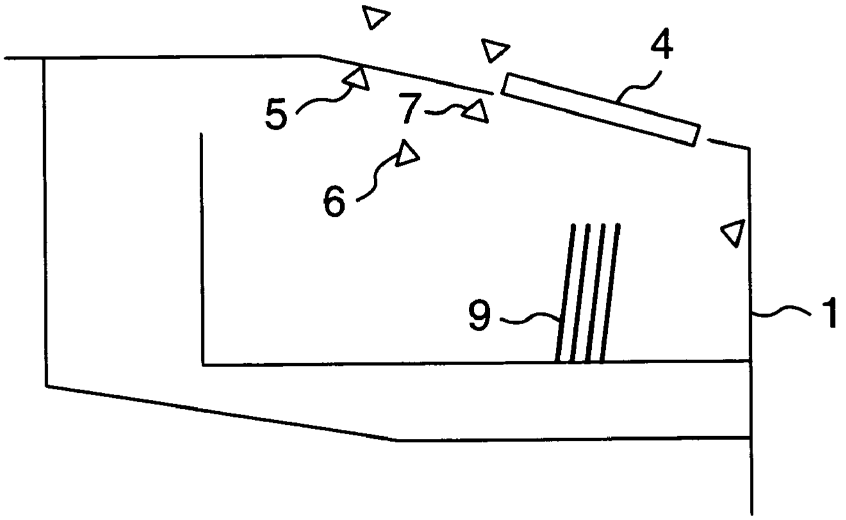
FIG. 5 is a diagram showing a state where the shutter is closed according to the first embodiment of the present invention.

Now, the first embodiment will be described with reference to FIGS. 3 to 5.

The user inserts a card or a passbook into the automated cash transaction device, and requests a deposit transaction via the display panel 2. The main control unit 107 transmits the request for the deposit transaction from the user to the host device 101 through the host line control unit 102. The main control unit 107 receives a reply from the host device 101 through the host line control unit 102 if the host device 101 has authorized the deposit traction, and commands the shutter control unit 105 to open the shutter 4. At this point in time, the display control unit 104 displays on the display unit 2 guidance on bill insertion into the money insertion/delivering port 1.

Figure 3:
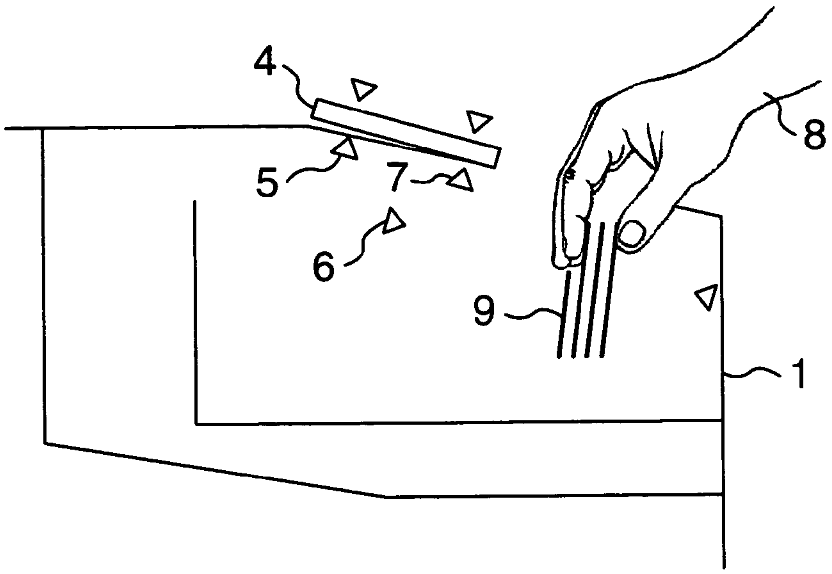
FIG. 3 is a diagram showing a state where a shutter is opened according to a first embodiment of the present invention.

FIG. 3 is a cross sectional view of the money insertion/delivering port 1, and specifically shows a state where a hand 8 of the user has been inserted into the money insertion/delivering port 1 in order to deposit bills 9 into the automated cash transaction device with the shutter 4 being opened. The sensor 7 senses full opening of the shutter 4. The sensor 6 senses insertion of a hand or the like into the money insertion/delivering port 1 and is mounted in such a position as to detect an object such as the hand 8 other than bills, placed in a location higher than a height of the bills 9 put inside the money insertion/delivering port 1 as shown in FIG. 4. The sensor 5 senses a predetermined intermediate position of the shutter 4 reached while the shutter is being slid to a fully open position or a fully closed position.

When the shutter 4 is opened, the user inserts the hand 8 into the money insertion/delivering port 1 so as to set the bills 9 in the money insertion/delivering port 1, as shown in FIG. 3. At this point in time, the sensor control unit 103 detects presence of the hand in the money insertion/delivering port 1 through the sensor 6. Further, the timer 109 starts counting. The timer 109 may be provided in the host device 101. When depositing money, the timer counts the time elapsed after the shutter 4 has been opened. When withdrawing money, the timer may count the time elapsed after the shutter has been opened. Alternatively, the timer may of course count the time elapsed after bills have been delivered from inside the automated cash transaction device to the money insertion/delivering port.

When a count of the timer 109 has exceeded a predetermined value, the main control unit 107 causes the shutter control unit 105 to close the shutter 4. However, when the count of the timer 109 has become the predetermined value and the hand 8 remains inside the money insertion/delivering port 1, the hand 8 is caught in the shutter 4 if the shutter 4 is closed. However, if pulling out of the hand by the user were to be waited for unconditionally, the time of occupying the automated cash transaction device by the user with his hand 8 put in the money insertion/delivering port would become longer. Operating efficiency of the automated cash transaction device might be thereby reduced.

In view of such, in the present invention, in order to prevent the user from getting his hand caught in the shutter, improve the operating efficiency of the automated cash transaction device, and then enhance usefulness of the automated cash transaction device, when notified that the count of the timer 109 has exceeded the predetermined value, or when a predetermined time has elapsed after the shutter 4 was opened, the main control unit 107 inquires the sensor control unit 103 to determine whether the sensor 6 senses the hand 8 or not.

When the hand 8 is not sensed, the main control unit 107 causes the shutter control unit 105 to close the shutter 4.

When the hand 8 is sensed, the main control unit 107 commands the shutter closing advance notice means control unit 108 to cause shutter closing advance notice means to execute processing so as to notify the user that the shutter is going to be closed. In this processing, the shutter 4 is closed up to a position at which the sensor 5 senses a rear end of the shutter 4 or at which the shutter 4 is closed to up to the intermediate position reached, not up to the fully closed position, as shown in FIG. 4. Then, the shutter 4 is opened to a position of its mechanical limit. In other words, an advance notice operation in which the shutter 4 is slid open and then shut over a predetermined distance is performed, thereby prompting the user to pull out the hand 8 from the money insertion/delivering port 1.

Then, when the sensor 6 has sensed pulling out of the hand 8 from the money insertion/delivering port 1, or has not sensed the hand 8 of the user, the sensor control unit 103 reports the status to the main control unit 107. Upon reception of the report, the main control unit 107 commands the shutter control unit 105 to close the shutter 4. The shutter is then closed as shown in FIG. 5. With this arrangement, the shutter is automatically closed without having the user making operations such as depressing a button for closing the shutter 4. Then, subsequent processing can be thereby performed promptly.

In order not to threaten the user more than necessary and to facilitate pulling out of the hand by keeping the size of an opening part of the money insertion/delivering port sufficiently large, the shutter 4 was slid to and fro once. Alternatively, in order to more attract user's attention, this sliding operation may be performed a plurality of times. Still alternatively, the shutter 4 may be slid to a predetermined position and held stopped at that position so as to cause pulling out of the hand 8 with a minimum motion of the shutter, without performing the round-trip sliding operation.

Figure 6:
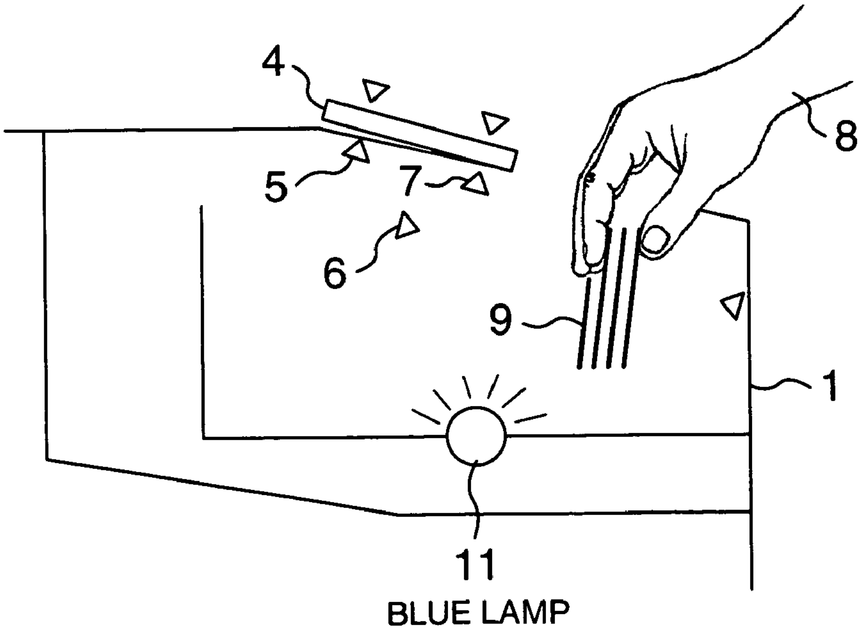
FIG. 6 is a diagram showing a state where the shutter is opened according to a second embodiment of the present invention.
Figure 7:
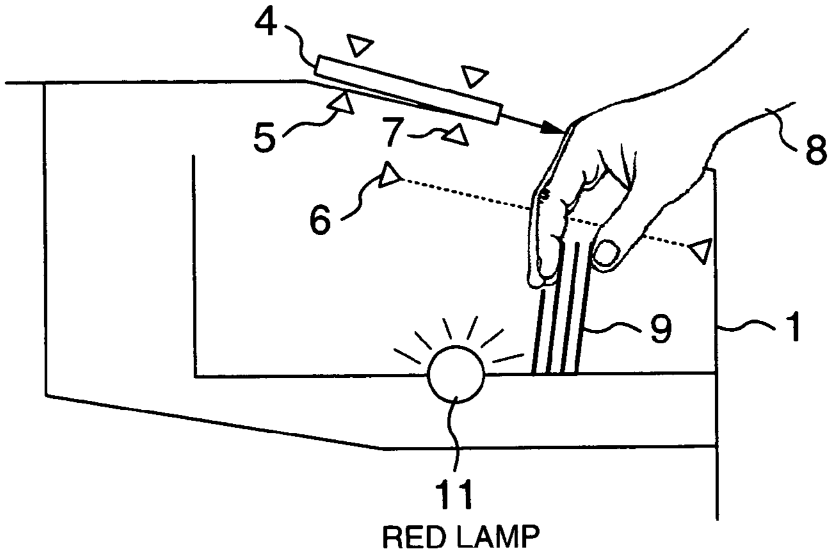
FIG. 7 is a diagram showing a state where closing of the shutter is noticed in advance according to the second embodiment of the present invention.
Figure 8:
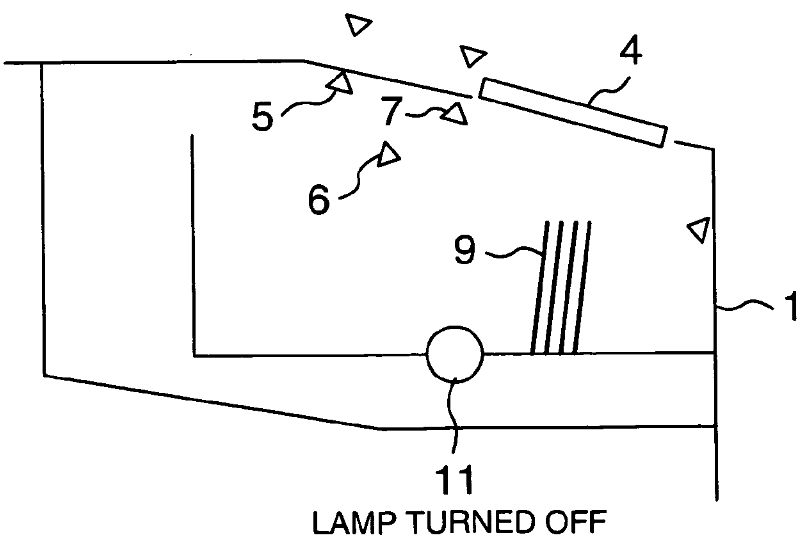
FIG. 8 is a diagram showing a state where the shutter is closed according to the second embodiment of the present invention.

Next, the second embodiment will be described with reference to FIGS. 6 to 8.

When the user requested a deposit transaction as in the first embodiment, the shutter 4 is opened, and the timer 109 starts counting. In the second embodiment, a lamp 11 is provided inside the money insertion/delivering port 1 as shutter closing advance notice means. When the shutter 4 is opened at first, the lamp 11 is turned on to blue, as shown in FIG. 6.

Next, when the count of the timer 109 has exceeded the predetermined value and the sensor 6 has sensed the hand 8, the shutter closing advance notice means control unit 108 causes the lamp 11 to be turned on to red.

When the sensor control unit 103 notifies to the main control unit 107 that the sensor 6 has not sensed the hand 8, the main control unit 107, which has received the notification, commands the shutter control unit 105 to close the shutter 4 and commands the shutter closing advance notice means control unit 108 to turn off the lamp 11. Then, the shutter 4 is closed, and the lamp 11 is turned off, as shown in FIG. 8.

Herein, red and blue are employed for colors of the lamp 11. The colors of the lamp 11, however, are not limited to these colors. In terms of power saving, the lamp 11 may be turned on only when closing of the shutter 4 is noticed in advance. Further, the lamp 11 may be flashed, because flashing of the lamp 11 can also draw attention of the user.

The lamp 11 may be located outside the money insertion/delivering port. However, in order to be closer to the hand of the user and the medium, it is preferable that the lamp 11 is located inside the money insertion/delivering port. Further, if the lamp 11 is located inside the money insertion/delivering port, it can illuminate an inside of the money insertion/delivering port, thereby improving convenience for customers.

As described above, in the first embodiment, closing of the shutter 4 can be noticed in advance by the shutter 4, while in the second embodiment, closing of the shutter 4 can be noticed in advance by the lamp 11 provided in the money insertion/delivering port. Thus, in both cases, closing of the shutter 4 can be noticed in advance near the hand of the user, or in a viewing range of the user who is seeing the medium or near the money insertion/delivering port. If the advance notice is made by a display on a screen of the display panel 2, the user must watch the display panel 2. If the advance notice is made by the loudspeaker 3 and a plurality of automated cash transaction devices are installed, the user may be confused, without knowing whether the advance notice is made to him, or to other user who is using other nearby automated cash transaction device. According to the present invention, however, the user is simply required to watch his hand alone, which improves convenience for the user.

If a comparison is made between the first and second embodiments, it can be seen that danger of the hand being caught in the shutter can be avoided in the first embodiment by modification of software without making any mechanical alteration to a conventional product. On the other hand, in the second embodiment, by turning on the lamp to red or the like, the danger of the hand being caught in the money insertion/delivering port can be informed to the user by more sensational appeal to vision. Thus, if these advantages of the first and second embodiments are combined for use, the effect of the invention would be more enhanced.

Finally, the third embodiment will be described with reference to FIGS. 9 to 11.

Figure 9:
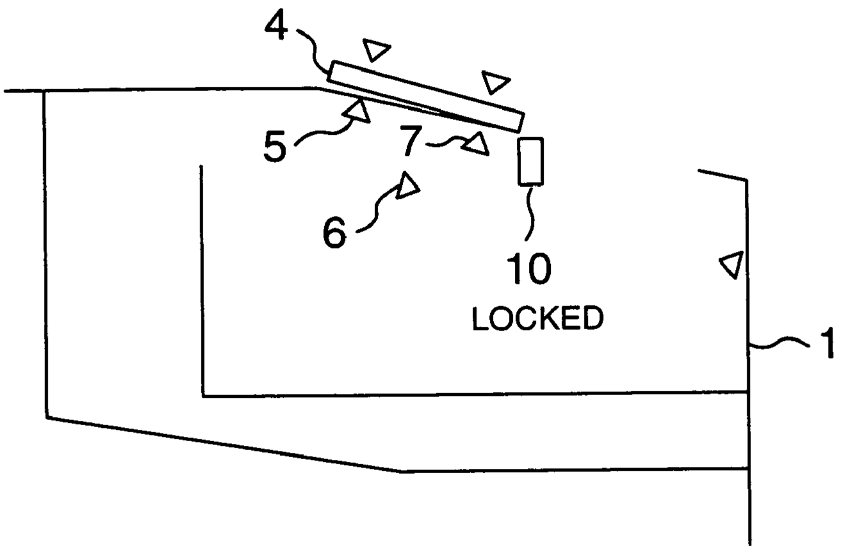
FIG. 9 is a diagram showing a state where the shutter is opened according to a third embodiment of the present invention.

In the third embodiment, a stopper 10 for stopping a closing operation of the shutter 4 as shown in FIG. 9 is added to the automated cash transaction device in the first embodiment shown in FIG. 3.

Figure 10:
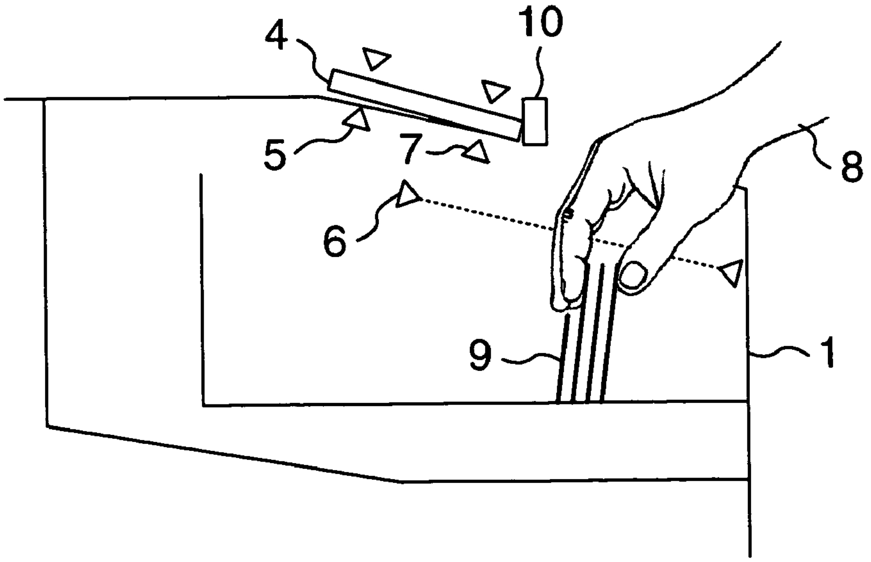
FIG. 10 is a diagram showing a state where a hand is being inserted into a money insertion/delivering port in the third embodiment.
Figure 11:
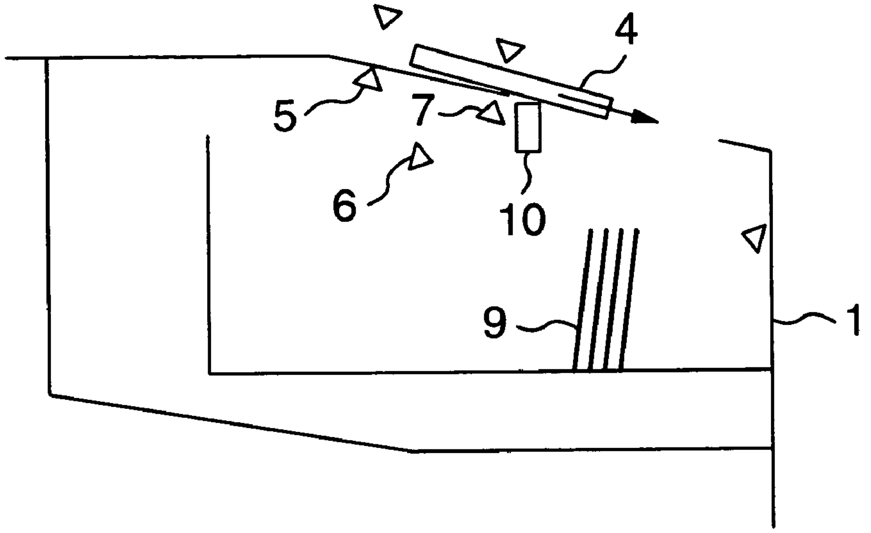
FIG. 11 is a diagram showing a state where the shutter gets closed according to the third embodiment of the present invention.

The stopper 10 operates according to a command from the shutter control unit 105: when the shutter 4 is opened as shown in FIG. 10, the stopper 10 stops the shutter 4 from moving. Then, the timer 109 starts counting. At this time, the stopper 10 is located in a position that can be seen from the user, which is a feature of the third embodiment.

When the count of the timer 109 has reached the predetermined value and the shutter 4 is closed, the stopper 10, located in the position that can be seen from the user, first operates to release control of the stopper 10 over the motion of the shutter 4. The shutter 4 is then closed. Accordingly, the operation of the stopper 10 leads to the advance notice of closing of the shutter.

Figure 12:
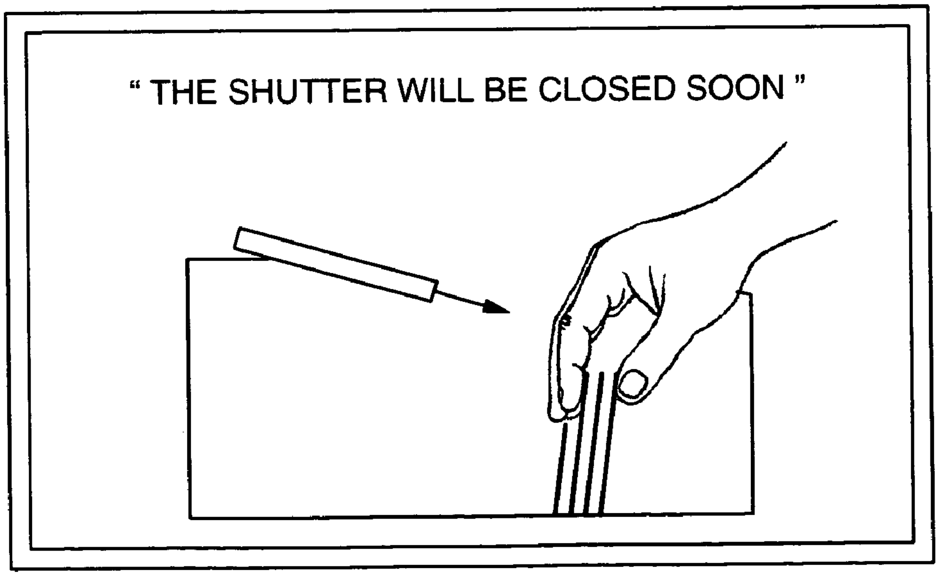
FIG. 12 is a diagram showing a display screen where closing of the shutter is being noticed in advance.

FIG. 12 shows an example of a screen on the display panel 2. Display of an advance notice that "The shutter will be closed soon" or an alarm on the display panel 2 in addition to arrangements in the first to third embodiments further enhances the effect of the present invention. Likewise, concurrent use of the audio guidance by the loudspeaker 3 can also enhance the effect of the invention.

Combination of all the first through three embodiments described above can also enhance the effect of the invention. Further, the present invention can be applied to a withdrawal transaction as well as the deposit transaction.

While foregoing descriptions were directed to the embodiments of the present invention, the present invention is not limited to these embodiments, and further variations are possible therein without departing from the spirit and scope of the invention.

By making advance notice of closing of the shutter near the hand of the user, the usefulness of the automated cash transaction device is enhanced.

What is claimed is:

1. A medium handling machine for handling a medium comprising:

- a media insertion/delivering port for receiving and delivering the medium;
- a shutter for opening or closing the media insertion/delivering port by being slid over an opening of the media insertion/delivering port;
- a sensor mounted inside the media insertion/delivering port in a position higher than a height of the medium, for sensing an object other than the medium;
- a timer for measuring a time during which the shutter is opened; and
- a control unit for causing the shutter to be slid to a position intermediate between a fully open position and a fully closed position when a measured time has reached a predetermined value and the sensor senses the object.

2. The medium handling machine according to claim 1, wherein the control unit causes the shutter to be slid to the intermediate position once or a plurality of times.

3. The medium handling machine according to claim 1, wherein the control unit causes the shutter to be closed when the sensor has not sensed the object.

4. The medium handling machine according to claim 1, further comprising:

- a stopper mounted to the media insertion/delivering port for stopping the shutter.

5. The medium handling machine according to claim 4, wherein the stopper stops the shutter from moving.

6. The medium handling machine according to claim 1, further comprising:

a lamp mounted in the media insertion/delivering port;

wherein the control unit causes the lamp to be turned on or flashed.

7. A medium handling machine for handling a medium comprising:

a media insertion/delivering port for receiving and delivering the medium;

a sensor mounted inside the media insertion/delivering port in a position higher than a height of the medium, for sensing a position of an object higher than a position of the medium received into the media insertion/delivering port;

a shutter provided to selectively cover an opening of the media insertion/delivering port, for opening or closing the media insertion/delivering port;

a timer for measuring a time during which the shutter is opened;

a lamp mounted in the media insertion/delivering port; and a control unit for causing the lamp to be turned on or flashed when a measured time has exceeded a predetermined value and the sensor senses the object.

8. The medium handling machine according to claim 7, wherein the lamp is turned on to blue or flashed when the shutter is opened, and turned onto red or flashed when the shutter starts being closed.

9. The medium handling machine according to claim 7, wherein the control unit causes the shutter to be closed when the sensor has not sensed the object.

10. A machine for handling a medium, comprising:

an insertion/delivering port for receiving and delivering the medium;

a shutter for selectively opening and closing the port;

a sensor mounted in the port, for sensing presence of an object other than the medium inserted in the port;

a timer for timing a period during which the port is open; and a control unit responsive to the sensor and the timer, configured for detecting a condition in which the sensor senses the object in the port when the period reaches a predetermined value, and responsive to the detecting of the condition, causing the shutter to move from a fully open position to a predetermined intermediate position between the fully open position and a fully closed position and to retract from the intermediate position without reaching the fully closed position.

11. The machine of claim 10, wherein the control unit is configured to cause the shutter to move to the intermediate position without reaching the fully closed position a plurality of times in response to a single detection of the condition.

12. The machine of claim 10, wherein the sensor is mounted inside the insertion/delivering port in a position higher than a height of the medium.

13. The machine of claim 10, wherein the control unit is configured to cause the shutter to move to the fully closed position when the object is removed from the port at a time after the sliding of the shutter to the intermediate position without reaching the fully closed position.

14. The machine of claim 10, further comprising:

a position sensor, for detecting when the shutter reaches the intermediate position, wherein the control unit is configured to initiate movement of the shutter from the fully open position toward the predetermined intermediate position upon detection of the condition and to initiate retracting of the shutter when the position sensor detects that the shutter has reached the intermediate position.

* * * * *